United States Patent
Neuberger et al.

(10) Patent No.: US 6,988,380 B2
(45) Date of Patent: Jan. 24, 2006

(54) METHOD OF SILICA OPTICAL FIBER PREFORM PRODUCTION

(75) Inventors: Wolfgang Neuberger, F.T. Labuan (MY); Leonid M. Blinov, Moscow (RU)

(73) Assignee: CeramOptec Industries, Inc., East Longmeadow, MA (US)

( * ) Notice: Subject to any disclaimer, the term of this patent is extended or adjusted under 35 U.S.C. 154(b) by 335 days.

(21) Appl. No.: 10/219,861

(22) Filed: Aug. 15, 2002

(65) Prior Publication Data
US 2004/0031289 A1 Feb. 19, 2004

(51) Int. Cl.
*C03B 37/018* (2006.01)
(52) U.S. Cl. .............. 65/391; 65/421; 65/425; 427/163.2
(58) Field of Classification Search ............ 65/391, 65/421, 425, 441
See application file for complete search history.

(56) References Cited

U.S. PATENT DOCUMENTS

| | | | |
|---|---|---|---|
| 4,776,918 A * | 10/1988 | Otsubo et al. | 156/345.41 |
| 5,145,507 A * | 9/1992 | Kyoto et al. | 65/398 |
| 5,597,624 A | 1/1997 | Blinov et al. | |
| 6,138,478 A | 10/2000 | Neuberger et al. | |

FOREIGN PATENT DOCUMENTS

JP  62-065948 A2  3/1987

OTHER PUBLICATIONS

Waynant et al., Electro-Optics Handbook, Copyright 2000, McGraw Hill, 2nd Edition, p. 12.1-12.3.*
Dianov et al., "Low-Hydrogen Silicon Oxynitride Optical Fibers Prepared by SPCVD," Journal of Lightwave Technology, vol. 13, No. 7, Jul. 1995, p. 1471-1474.*
Noguchi et al., "Loss Increase for Optical Fibers Exposed to Hydrogen Atmosphere," Journal of LightWave Technology, vol. LT-3, No. 2, p. 236-243.*

* cited by examiner

*Primary Examiner*—Steven P. Griffin
*Assistant Examiner*—Lisa Herring
(74) *Attorney, Agent, or Firm*—BJ Associates; Bolesh J. Skutnik

(57) ABSTRACT

A method is disclosed for the manufacture of optical fiber preforms using plasma enhanced chemical vapor deposition (PECVD). The invention consists of a cylindrical reactor in which material such as flourine-doped silica glass is deposited on a cylindrical silica rod. A furnace for regulating reactor temperature encases the reactor. A microwave generator coupled with a resonator and an $H_{10}$ waveguide delivers microwave energy to the reactor, producing simultaneously symmetrical excitations in the $E_{010}$ mode and a plasma surface wave in $E_{01}$ mode located at the surface of the rod. A microwave plasma is scanned along the length of the rod through a slit in the reactor to deposit a homogeneous film of a desired thickness. The benefits of the present invention over the prior art include increased absorption of delivered power, and the ability to uniformly deposit films such as flourine-doped silica on rods with diameters of up to 30–35 mm and thus produce optical fiber preforms with diameters greater than 40 mm.

11 Claims, 1 Drawing Sheet

METHOD OF SILICA OPTICAL FIBER PREFORM PRODUCTION

BACKGROUND OF THE INVENTION

1. Field of the Invention

The invention relates to methods of silica preform manufacturing, in particular for creation of optical fiber lightguides with reflective cladding deposited by microwave plasma enhanced chemical vapor deposition (PECVD).

2. Information Disclosure Statement

Optical fibers are currently manufactured through a drawing process, where fibers are drawn from a preform with a large diameter. These preforms are generally high purity glass or plastic. The fiber cladding is often applied to the preform prior to drawing the fiber.

The most common methods for the manufacture of fiber preforms involve chemical vapor deposition (CVD), which entail the use of vaporized raw materials that combine with oxygen and solidify into glass. The principle CVD methods can be grouped into two categories. The first is those methods that utilize thermal energy to create the precursor vapor, and includes modified chemical vapor deposition (MCVD), outside vapor deposition (OVD), and vapor axial deposition (VAD). The second utilizes electromagnetic radiation to ionize precursor gas, thus forming a plasma from which the glass is deposited. Method in this category include plasma CVD (PCVD) and plasma enhanced CVD (PECVD).

U.S. Pat. No. 6,138,478 by Neuberger et al discloses a method and device for silica preform production by microwave plasma deposition of an $SiO_2$—F cladding on a silica rod. The invention uses microwaves with a frequency of 2,450 MHz. This method is limited in that it cannot produce a uniform deposition on a silica rod with a diameter greater than 25. This limitation is due to the nonsymmetry of $E_{020}$ mode excitation and arising nonsymmetrical wave of TE type. Microwave power losses on irradiation of large diameter silica rods and a hole in the reactor can be up to 20% of the incident microwave power. This leads to deterioration of preform quality for large rods, and thus to a restriction on preform diameter. It is also impossible to increase productivity, as determined by deposition rate and silica rod diameter, by this method.

The closest analog to the present invention is disclosed in U.S. Pat. No. 5,597,624 by Blinov et al. A method of PECVD is described wherein a surface plasma wave of either the symmetric $E_{01}$ or the hybrid $HE_{11}$ type is excited on the outside surface of a dielectric starting body, such as a silica tube. However, this method cannot be used in commercial-scale manufacturing of large diameter and high quality silica preforms because of a lack of high power impulse microwave sources (both generators and amplifiers) that deliver microwaves in the 2450 MHz region with a 10 kW average power and 1 ms impulse duration.

The present invention is also useful for preventing hydrogen diffusion, or corrosion of the cladding due to environmental conditions, which can be especially severe in high temperature applications. Adverse environmental conditions combined with stress serve to exacerbate this problem. High optical losses due to hydrogen diffusion are found in known silica optical fibers. To prevent hydrogen diffusion, and thus protect the fiber and extend its useful life, a buffer $SiO_xN_y$ layer is typically applied. Generally, the thickness of such a layer is in the range of 100–10,000 A depending on the optical fiber application. Other $SiO_xN_y$ layer thicknesses, up to a few microns, can be produced if needed.

Although deposition of an $SiO_xN_y$ layer is known and used to prevent hydrogen diffusion, modern sputtering or deposition equipment is expensive and these devices and methods fail to generate a homogeneous layer. Additionally, in present methods the deposition process is synchronized with the drawing of optical fibers from a silica preform. Applying an $SiO_xN_y$ layer during drawing necessitates a decrease in the fiber drawing rate, and further results in a decrease in process productivity and an increase in the basic cost of fibers. This leads to considerable reduction of production efficiency (especially for preform diameters within 30–40 mm).

A method of depositing $SiO_xN_y$ layers during the manufacture of optical fiber preforms, so as to prevent hydrogen diffusion, is known, and is described in Japanese Patent No. 62-65948 by Akira et al. This method eliminates the need to deposit $SiO_xN_y$ layers during fiber drawing and thus eliminates the production efficiency problems described above.

However, this method requires a two-stage process and has a low efficiency in the deposition of chemical reagents (less than 50% of gaseous reagents are actually deposited). Two setups are required for use in this process. The first is a device for the deposition of a soot $SiO_2$ layer by MCVD, VAD, OVD on a preform surface. The second is a device for vitrifying the soot in an atmosphere of $N_2$ and He. This process is rather long, and Helium is expensive. The basic drawback of this method is the application of high temperature deposition technologies (MCVD, VAD, OVD) that do not produce effective $N_2$ dissociation (even at temperatures exceeding 2000° C.) in a gas phase or effective $N_2$-doping of synthesized $SiO_2$ glass layers.

OBJECTIVES AND BRIEF SUMMARY OF THE INVENTION

It is an object of the present invention to provide a plasma CVD fiber optic preform manufacturing method that is capable of producing preforms of a larger diameter than known methods and devices.

It is another object of the present invention to provide a plasma CVD fiber optic preform manufacturing method that is capable of producing preforms of a higher quality than known methods and devices.

It is still another object of the present invention to provide a plasma CVD fiber optic preform manufacturing method that has higher production capabilities than known methods and devices.

It is a further object of the present invention to provide a plasma CVD fiber optic preform manufacturing method that increases the amount of absorbed microwave power per unit plasma volume (W/cm$^3$) at the permanent frequency of a microwave generator, thereby depositing a preform cladding layer in a shorter time with a more efficient use of microwave power and precursor gas.

Briefly stated, the present invention discloses a method for the manufacture of optical fiber preforms using plasma enhanced chemical vapor deposition (PECVD). The invention consists of a cylindrical reactor in which material such as flourine-doped silica glass is deposited on a starting body such as a cylindrical silica rod. A furnace for regulating reactor temperature encases the reactor. A microwave generator coupled with a resonator and an $H_{10}$ waveguide delivers microwave energy to the reactor, producing simultaneously symmetrical excitations in the $E_{010}$ mode and a plasma surface wave in $E_{01}$ mode located at the surface of the rod. A microwave plasma is scanned along the length of the rod through a slit in the reactor to deposit a homogeneous film of a desired thickness. The benefits of the present invention over the prior art include increased absorption of delivered power, and the ability to uniformly deposit films such as flourine-doped silica on rods with diameters of up to 30–35 mm and thus produce optical fiber preforms with diameters greater than 40 mm.

The above, and other objects, features and advantages of the present invention will become apparent from the following description read in conjunction with the accompanying drawing.

DETAILED DESCRIPTION OF PREFERRED EMBODIMENTS

Figure 1:
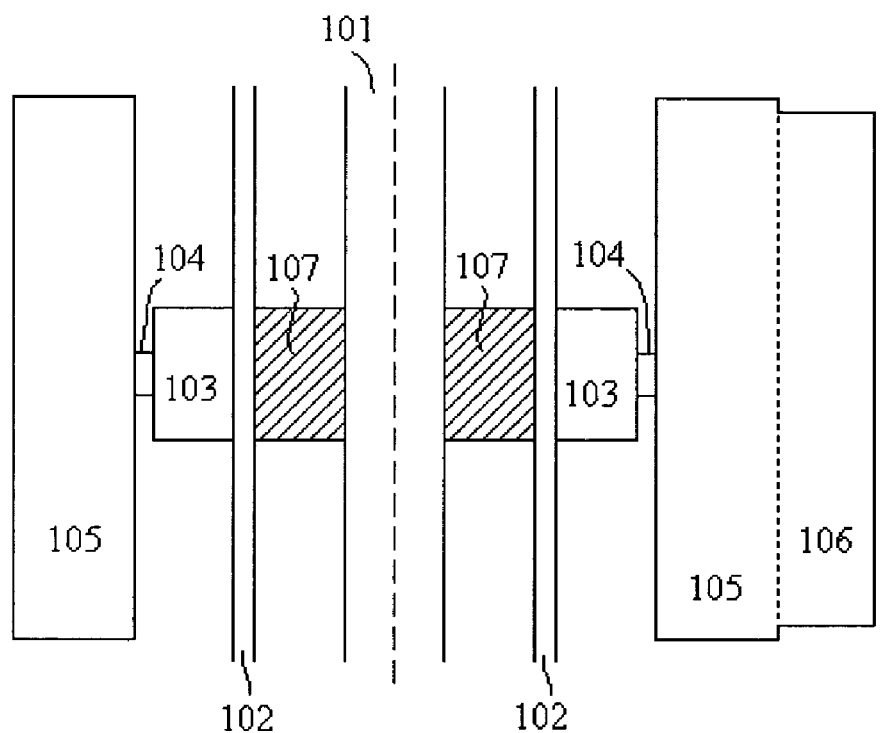
FIG. 1—Illustration of the present invention through a plane parallel to the central cylindrical axis.

The present method consists of creating and moving a microwave plasma, in a low pressure reactor, along a silica rod with a high diameter (30–35 mm) by means of simultaneous symmetrical excitations of $E_{010}$ mode waves and plasma surface waves (PSW) of $E_{01}$ type. The $E_{01}$ type plasma surface wave (PSW) is located on the interface between the silica rod and the plasma, where the electric field strength is maximum. The electric field strength exponentially decreases as it extends radially both to the wall of the reactor and to the center of the rod. Thus, the reactor (silica tube) wall is located in a region where the electric field is at a minimum. The $E_{010}$ mode in the cavity and the $E_{01}$ type PSW along the surface of the silica rod are created simultaneously in one device by symmetrical and homogeneous excitation from a single microwave power source through a special system of coupled inputs of energy.

In this case, microwave power losses on irradiation through the silica rod and holes in the resonator are reduced and specific absorbed microwave discharge power increases because more energy is absorbed by the plasma due to E field intensity distribution and is used in reagent excitation rather than being lost through absorption by the rod, the wall, or holes in the resonator. The present invention deposits a cladding material, such as $SiO_2$—F, of uniform thickness on a silica rod and features a higher deposition rate than is available with the prior art. This device is capable of producing preforms with diameters up to and greater than 40 mm. Because of its high efficiency and its ability to produce large diameter preforms, the present invention can significantly reduce the manufacturing cost of two-layer silica lightguides with cladding.

A preferred embodiment of the present invention is more particularly described in conjunction with FIG. 1. A device used to accomplish $E_{010}$ mode and $E_{01}$ type PSW excitation followed by preform deposition comprises the following basic components: Silica rod 101, reactor 102, resonator 103, coupled opening 104, $H_{10}$-waveguide 105, and delivery $H_{10}$-waveguide 106.

Cylindrical silica rod 101, whose diameter is up to 30–35 mm, is located within reactor 102. Reactor 102 is a hollow rod, preferably silica, with a diameter of 50 mm in a preferred embodiment. Both rod 101 and reactor 102 are mounted coaxially with and inside a vertical cylindrical furnace for homogeneous heating. Typical furnace temperatures are preferably in the approximate range of 1100–1200° C. A microwave generator couples microwave radiation to waveguide 105 for delivery via delivery waveguide 106. Waveguide 105 in turn delivers radiation to resonator 103, where an $E_{010}$ mode is excited through a system of coupled openings in resonator 103. The waveguide-generator-resonator apparatus can be scanned forward and back along silica rod 101 along the cylindrical axis of rod 101 through a slit in the furnace. The radial electric field intensity distribution resulting from the combination of wave mode $E_{010}$ and plasma surface wave $E_{01}$ exponentially decreases as the field extends radially from the surface of rod 101 towards reactor 102 and towards the center of rod 101. Thus, silica rod 101 is located in the region of maximum electric field value ($E_{010}$+PSW $E_{01}$), and reactor 102 is located in a region of minimum electric field value.

In a preferred embodiment, deposition of flourine-doped silica glass is carried out by thermal or microwave plasma-chemical treatment of silica rod 101 and reactor 102. As a preliminary step, microwave discharge 107 is ignited by the addition of pure oxygen. A precursor gas mixture consisting of $SiCl_4+O_2+C_3F_8$ (or other suitable F-Compounds) is then delivered into the cavity between rod 101 reactor 102. The operation pressure within reactor 102 during the deposition process is preferably maintained at about 5–10 torr. The operation pressure is variable, and can be modified as seen fit to accommodate a desired gas flow, microwave power level and design deposition rate. The appropriate thickness of the resulting $SiO_2$—F cladding is dictated by the predetermined cladding/core ratio and predetermined fiber diameter. Generally, a preferred cladding-to-core thickness ratio is between about 1.06–1.4. Examples of technical process parameters that could be used in this preferred embodiment are presented below. The following examples are purely illustrative, and do not limit the present invention to those parameters.

EXAMPLE 1

| | |
|---|---|
| The silica rod diameter, mm | 30 |
| The reactor diameter, mm | 50 |
| The length of deposition zone, mm | 1200 |
| Frequency of generator, MHz | 2400 |
| Generator power, kW | 5.6 |
| Speed of movement of plasma generator, kW | 2.0 |
| Oxygen flow, $cm^3$/min | 6000 |
| Freon Flow $C_3F_8$, $cm^3$/min | 150 |
| $SiCl_4$ flow, $cm^3$/min | 1450 |
| Gas pressure, torr | 6.0 |
| Reactor Temperature, C. | 1150 |
| Preform diameter, mm (ratio is 1.2) | 36 |

EXAMPLE 2

| | |
|---|---|
| The silica rod diameter, mm | 35.0 |
| The reactor diameter, mm | 50.0 |
| The length of deposition zone, mm | 1200 |
| Frequency of generator, MHz | 2450 |
| Generator power, kW | 6.0 |
| Speed of movement of plasma generator, kW | 2.0 |
| Oxygen flow, $cm^3$/min | 7500 |
| Freon Flow $C_3F_8$, $cm^3$/min | 180 |
| $SiCl_4$ flow, $cm^3$/min | 1800 |
| Gas pressure, torr | 8.0 |
| Reactor Temperature, C. | 1150 |
| Preform diameter, mm (ratio is 1.1) | 38.5 |

The present invention is also an effective means of improving the quality of manufactured optical fibers by increasing the durability and the useful life of such fibers and preforms, particularly under high temperature conditions. The present invention achieves this through microwave plasma deposition of a coating of $SiO_xN_y$ on the surface of a preform. The plasma created in the present invention contains "hot" electrons that possess high kinetic energy. These electrons are capable of stimulating effective $N_2$ dissociation in the gas phase by electron impact. This is beneficial in that it leads to highly effective introduction of atomic nitrogen in a glass matrix. This reliable chemosorption of nitrogen is carried out in silica layers grown at low reactor temperature (about 1200 C).

In the disclosed method, a $SiO_xN_y$ layer is deposited on the flourine-doped silica cladding layer previously deposited on the silica rod. This $SiO_xN_y$ deposition is accomplished using the same microwave plasma-chemical deposition method, at pure conditions, as is previously described in the present invention's method for cladding deposition. The preferred thickness of a protective coating for a 30 mm diameter preform is more than 0.3 mm. The present invention is more desirable than other prior art methods for deposition of a protective $SiO_xN_y$ coating in that its characteristics include a high deposition rate and a greater uniformity of the deposited protective coating. The present invention can be accomplished in one step, is a very clean process, and produces a high quality coating.

After deposition of a $SiO_xN_y$ coating, 30–40 mm diameter preforms can be drawn into fibers with great speed, at drawing rates of greater than 100 m/min, because all protective coatings are initially on the preform. As a result, the present invention improves the productivity of lightguide manufacture, improves optical fiber quality, and reduces the base cost of fibers.

Optical fiber preform manufacturing according to the present invention is carried out by the following method. The parameters used in the following description are for illustration purposes, and do not limit the invention to those materials or parameters.

Reactor 102 and silica preform rod 101 are mounted coaxially in electric furnace 108 (not shown). The $SiO_2$—F/$SiO_2$ preform is produced with the method described earlier using low pressure microwave plasma deposition. In this example, the total diameter of the produced preform, including the cladding, is 36 mm. After the cladding has been deposited, a gas mixture such as $N_2+O_2+SiCl_4$ or $N_2$+air+$SiCl_4$ is supplied to the microwave plasma zone 107 for deposition of a protective $SiO_xN_y$ layer. The furnace temperature is set at approximately 1200° C. In principle, the $SiO_xN_y$ deposition process is analogous to the $SiO_2$—F deposition process described above. However, the present method is distinguishable in that the microwave power and the furnace temperature during $SiO_xN_y$ deposition are increased while the reactor (silica tube) temperature is held constant at 1200° C. In this process, $N_2$ is the basic carrying gas and $O_2$ or air are the dopants. It is necessary, during the deposition process, to decrease the $O_2$ content of the process gas by up to 7–10% because full $SiCl_4$ oxidation to $SiO_2$ occurs at higher $O_2$ concentrations. In cases where there is a higher $O_2$ concentration, $N_2$ does not take part in the chemical reaction. Also, the nitrogen concentration in the silica glass should be increased gradually to avoid cracking of the deposited $SiO_xN_y$ layers during cooling. This is a danger because $SiO_xN_y$ has a much higher thermal expansion coefficient than does pure silica.

The produced preform should also be gradually and uniformly cooled after the deposition process is complete.

Examples of technological parameters of $SiO_xN_y$ layer deposition on $SiO_2$—F/$SiO_2$ preform surfaces follow.

EXAMPLE 3

| | |
|---|---|
| Nitrogen flow, $cm^3$/min | 700 |
| $N_2$-flow in $SiCl_4$-bubbler, $cm^3$/min | 300 |
| Air flow, $cm^3$/min | 540 |
| Reactor temperature, C. | 1200 |
| Preform diameter, mm | 36 |
| Reactor diameter, mm | 50 |
| Length of deposition zone, mm | 1200 |
| Frequency of generator, MHz | 2450 |
| Power of generator, kW | 6.0 |
| Speed of movement of plasma generator, m/min | 2.0 |
| Pressure, torr | 6.0 |
| Thickness of Si—O—N coating, mm | 0.36 |

Investigations have shown that the nitrogen concentration in the $SiO_xN_y$ glass matrix is typically 8–10%. This nitrogen presence prevents hydrogen diffusion through the optical fiber because atomic nitrogen introduced in the silica glass matrix fills all the gaps of the glass structure and thus prevents hydrogen from diffusing through this protective layer. As a result, optical losses can be greatly reduced or eliminated. For example, fibers with a $SiO_xN_y$ protective coating exhibited no increases in optical losses when used in an $H_2$ atmosphere and at temperatures of 200° C.

$SiO_xN_y$ layers can be deposited directly on the outside surface of a silica tube prior to cladding deposition using the method described above. In this case a bare silica rod should be introduced into the reactor tube to preclude any plasma formation within the tube. To avoid microwave discharge in the small gap between the rod and the tube it is necessary to sustain atmospheric pressure in the gap. Other than the prescribed pressure, the remaining parameters listed in Example 3 can be used for this deposition process.

$SiO_xN_y$ glass can be also deposited on capillaries (note that, in order to prevent a plasma from forming within the capillary, atmospheric pressure inside the capillary should be maintained during deposition), silica rods and optical fibers (fiber diameter is preferably 2–8 mm), and planar quartz substrates (100×10×1 mm and other sizes) by using the scanning $E_{010}$ resonator. These articles must be coaxially located within the silica tube along the tube axis under microwave plasma transference (pressure is 1–100 torr). In a preferred embodiment, the tube diameter may be 20×17 mm, 23×20 mm. The following example lists possible process parameters for protective layer deposition on a capillary.

EXAMPLE 4

| | |
|---|---|
| The silica tube diameter, mm | 20 × 17 |
| The silica capillary diameter, mm | 6.0 |
| Nitrogen flow, $cm^3$/min | 60 |
| Nitrogen flow in $SiCl_4$-bubbler, $cm^3$/min | 30 |
| Air flow, $cm^3$/min | 60 |
| The silica tube temperature, C. | 1200 |
| Oxygen content in gas mixture, % | 8 |

The deposition rate of the $SiO_xN_y$ glass layer in this example is 0.5 microns/min, and the thickness of the coating deposited may be from 0.1–1 micron. The tube reactor is not needed in this process. Input and output hole diameters of the $E_{010}$ resonator must be decreased in accordance with any reduction in the silica tube diameter. In this case metal screens are inserted into resonator holes. The metal screens in the resonator should be coated by a microwave absorbing material such as graphite. A gas mixture of $SiH_4+NO+NH_3$ is a preferred mixture for deposition of a $SiO_xN_y$ layer with high nitrogen content. The deposition temperature should be between 800–900° C. The index of refraction and the percentage of nitrogen in the $SiO_xN_y$ layer are linearly dependent on the ratio of $NH_3$ to NO ($NH_3$/NO) used in the process gas mixture. For example, at ratio $NH_3$/NO=1000, the refractive index "n" of the $SiO_xN_y$ layer is 1.85 (the wavelength is 546 nm). The layers deposited with these parameters were 50% atomic nitrogen. Any $SiO_xN_y$ compositions can be manufactured with the present method. These compositions can be appreciated with sufficient accuracy by n-value.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A method of manufacturing optical fiber preforms comprising the steps of:
   a. arranging a rod coaxially within a hollow cylindrical reactor, creating a cavity between said rod and said reactor;
   b. reducing pressure in said cavity to a predetermined level;
   c. enclosing said rod and said reactor coaxially within a hollow cylindrical furnace, and heating said rod and said reactor to a specified temperature;
   d. introducing a process gas mixture in said cavity, wherein said mixture is comprised of materials to be deposited;
   e. generating a plasma in said cavity by simultaneously exciting an $E_{010}$ electric field mode wave and an $E_{01}$ electric field type plasma surface wave in said cavity by means of a microwave system, wherein said plasma surface wave is located at an interface between said rod and said plasma;
   f. wherein an electric field is at a maximum intensity at a radial distance from the central axis of said cavity equal to a distance where said rod-plasma interface is located; and wherein said intensity exponentially diminishes as the radius increase to said reactor and as the radius decreases toward said axis; and
   g. moving said plasma along said cavity in a direction parallel to the axis of said cavity, thereby uniformly depositing said materials on said starting body.

2. A method of manufacturing optical fiber preforms according to claim 1, wherein said microwave system comprises a resonator, a waveguide, and a microwave source.

3. A method of manufacturing optical fiber preforms according to claim 1, wherein said starting body is a solid silica rod.

4. A method of manufacturing optical fiber preforms according to claim 1, wherein said $E_{010}$ mode and plasma surface wave $E_{01}$ are created simultaneously in said microwave source by symmetrical and homogeneous excitation from said microwave source through a system of coupled inputs of energy.

5. A method of manufacturing optical fiber preforms according to claim 1, wherein said material is deposited on said rod to form a reflective cladding.

6. A method of manufacturing optical fiber preforms according to claim 5, wherein said material is fluorine doped silica.

7. A method of manufacturing optical fiber preforms according to claim 1, wherein said material is deposited on said rod to form a protective layer.

8. A method of manufacturing optical fiber preforms according to claim 7, wherein said protective layer is deposited by the method in claim 1 after a reflective cladding is deposited.

9. A method of manufacturing optical fiber preforms according to claim 7, wherein said process gas mixture consists of $SiH_4$, $NH_3$, and NO.

10. A method of manufacturing optical fiber performs according to claim 7 wherein said protective layer is made from a process gas mixture selected from the group consisting of ($N_2+O_2+SiCl_4$) and ($N_2$+air+$SiCl_4$).

11. A method of manufacturing optical fiber preforms according to claim 10 wherein said protective layer is a film of $SiO_xN_y$.

* * * * *